Oct. 18, 1927.  1,645,592
F. G. FOLBERTH ET AL
WINDSHIELD CLEANER
Filed Jan. 22, 1924  2 Sheets-Sheet 1
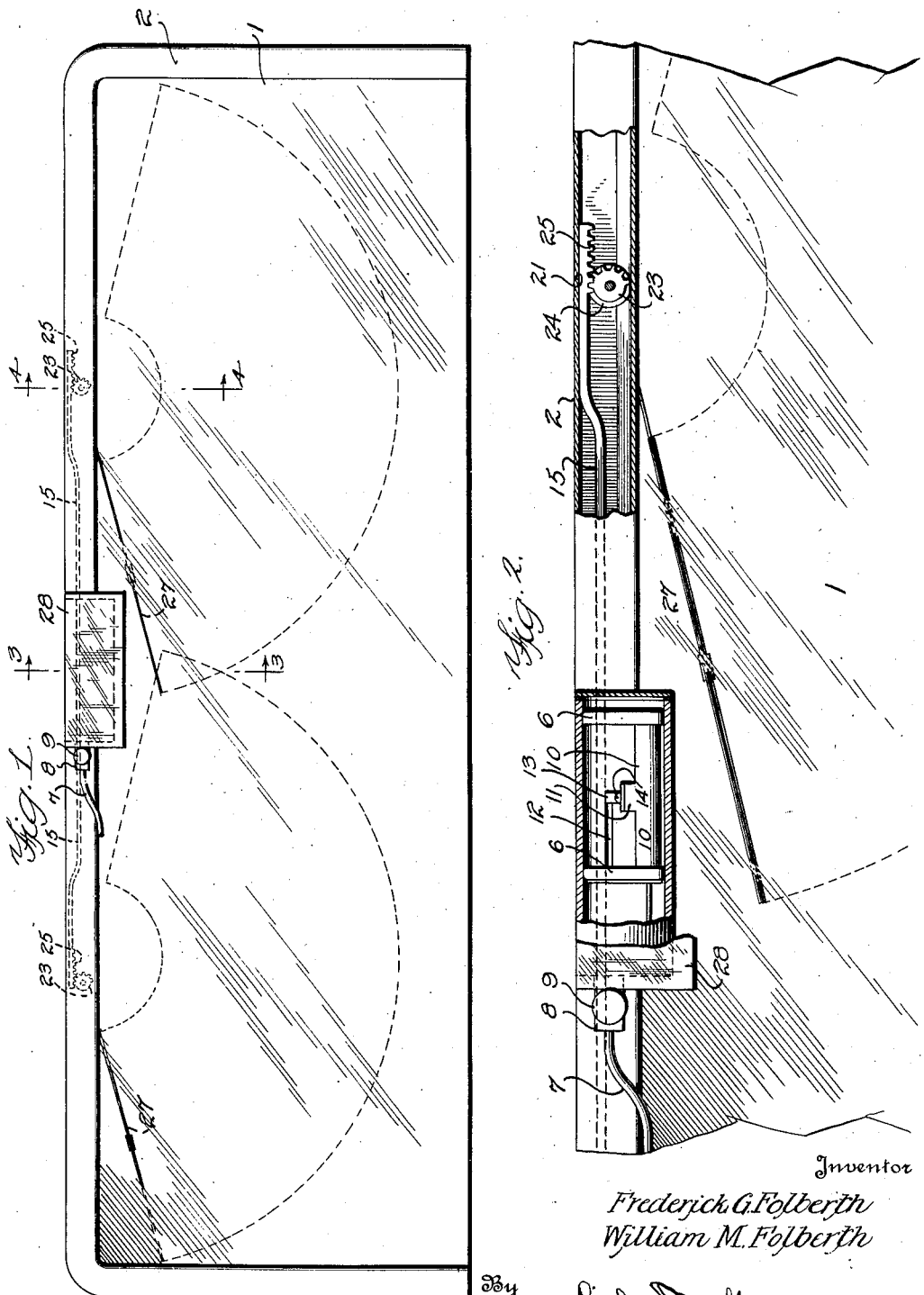
Inventor
Frederick G. Folberth
William M. Folberth
By
Attorney

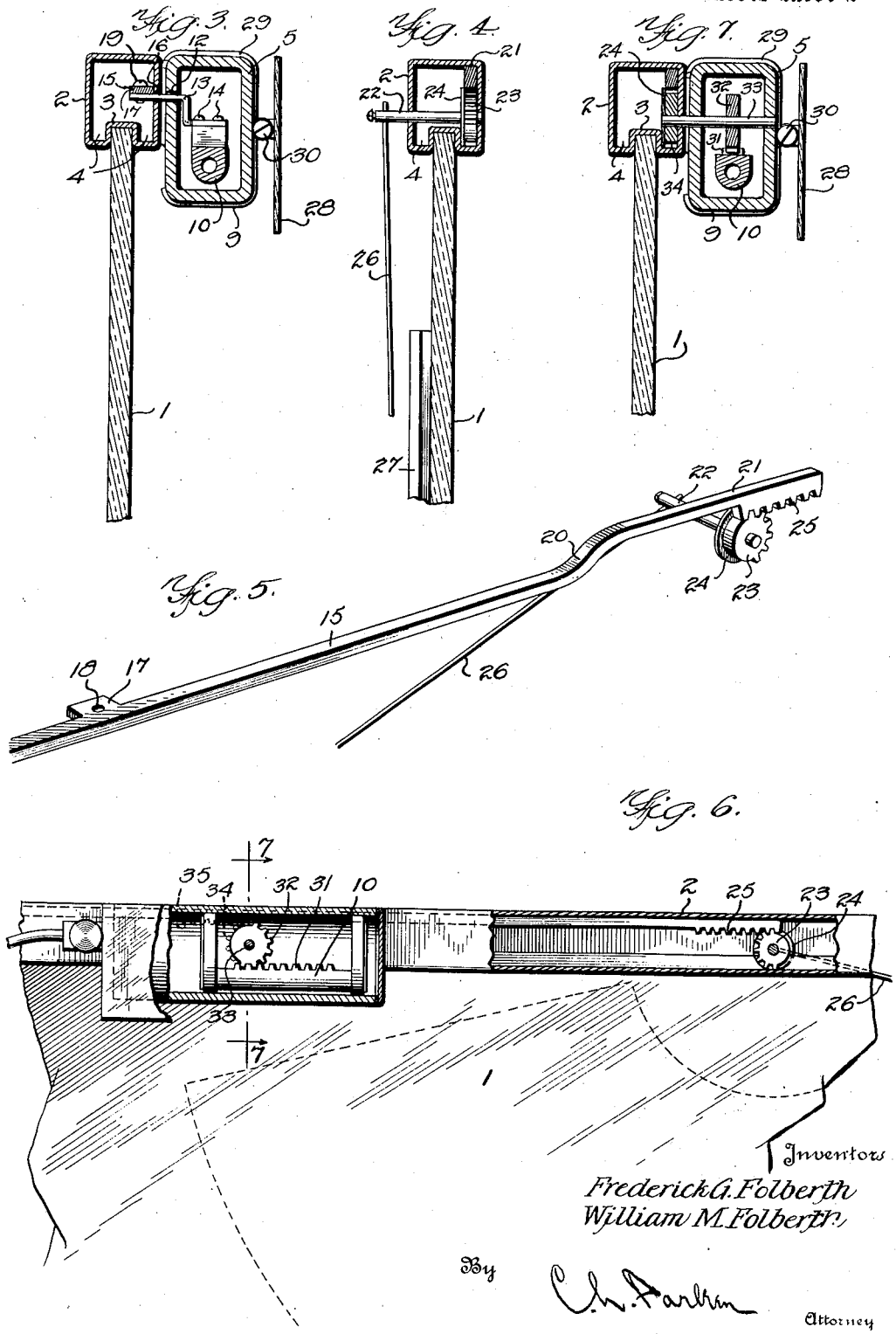

Patented Oct. 18, 1927.

1,645,592

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed January 22, 1924. Serial No. 687,793.

This invention relates to windshield cleaners and an object of the invention is to provide a windshield cleaner motor having a drive member arranged within the frame of the windshield to actuate the cleaner elements and thus hide the operating means from view.

In the accompanying drawings, we have shown several embodiments of the invention. In this showing:

Figure 1 is a front elevation of a section of a windshield showing the invention applied, Figure 2 is a similar view, parts being shown in section, to show the operating mechanism, Figure 3 is a vertical sectional view on line 3—3 of Figure 1, Figure 4 is a similar view on line 4—4 of Figure 1, Figure 5 is a perspective view of a portion of the drive member, Figure 6 is a view similar to Figure 2, showing a modified form, and Figure 7 is a transverse sectional view on line 7—7 of Figure 6.

Referring to the drawings, the reference numeral 1 designates a windshield or the upper section of a windshield formed of glass or other transparent material and mounted in a suitable frame 2.

As shown in Figures 2 to 4 of the drawings, the windshield frame is hollow and preferably formed of metal. The inner face of the frame is provided with a groove 3 adapted to receive the edge of the glass, and channels 4 are formed on opposite sides of this groove. The windshield cleaner comprises a motor casing 5 which is substantially air tight and is adapted to receive a piston or pistons 6. These pistons are adapted to be reciprocated within the cylinder by differential pressure and the motor is connected to a source of suction, such as the intake manifold of the engine (not shown) by means of a conduit 7, communicating with an inlet chamber 8 at one end of the motor casing. A suitable hand control valve 9 may be provided and the motor may be provided with automatic valves (not shown) to alternately establish communication between the source of suction and the opposite ends of the cylinder and reciprocate the pistons. Valve mechanism, such as is shown in the prior patent to William M. Folberth, Reissue No. 15,502, granted December 5, 1922, may be employed, or any other suitable valve mechanism may be employed.

In the form of the invention shown in Figures 1 to 5 of the drawings, the pistons are connected by a web 10 having a central enlargement 11. The side of the motor casing adjacent the windshield frame is provided with a slot 12. The motor casing is secured to the windshield frame in any suitable manner. An arm or bar 13 extends through the slot 12 and the end of the arm is extended downwardly and secured to the enlargement 11 by suitable fastening elements 14. A drive member 15 is arranged within the windshield frame and the frame is provided with a slot 16 arranged in alinement with the slot 12. One end of the arm 13 passes through this slot and is secured to the drive member 15. As shown, the central portion of the drive member is provided with an enlarged portion 17, having an opening 18. A screw or bolt 19 passes through this opening and through an opening in the arm 13. Adjacent each end of the drive member, there is provided an offset 20 to arrange the end portion 21 adjacent the top of the windshield frame, as shown in Figures 2 and 4 of the drawings. A shaft 22 extends through the windshield frame beneath the end portion 21 of the drive member and this shaft projects from the front of the frame, as shown in Figure 4. A segmental gear 23 is mounted on this shaft, and this gear carries a disk 24. The end portion of the drive member is provided with a rack 25, adapted to mesh with the teeth of the segmental gear. The disk 24 engages the side of the drive member to form a guide for the drive member. A cleaner arm 26 is secured to the projecting portion of the transverse shaft 22 and this cleaner arm is adapted to carry a cleaner element 27 which contacts with the surface of the glass to be cleaned. As shown in Figure 1 of the drawings, the drive member may extend in each direction from the motor casing to actuate a pair of cleaner elements adjacent each side of the windshield frame.

As shown, a mirror 28, slightly larger in size than the side of the motor casing is mounted on a suitable bracket 29, consisting of resilient arms extending around the motor casing. The mirror is secured to the bracket by means of an adjustable clamp 30, to permit change in the angle of the mirror.

In Figures 6 and 7 of the drawings, we have shown a slight modification of the connecting means between the actuating member or pistons and the drive member. As shown, in this form of the invention, the web 10 is provided with rack teeth 31 adapted to mesh with a pinion 32 mounted on a shaft 33 extending transversely of the motor casing. This shaft projects from one side of the motor casing and passes into the windshield frame. A gear 34 is arranged on the shaft within the frame and meshes with a rack 35 formed on the drive member.

The operation of the device will be apparent from the foregoing description. The reciprocation of the pistons 6 within the cylinder is transmitted to the drive member 15 and by means of the drive member, the shafts 22 are oscillated to swing the cleaner arms 26 and the cleaner elements 27 through an arc of a circle and thus clean a portion of the windshield, as indicated in dotted lines in Figures 1, 2, and 7 of the drawings. The channels 4 formed in the construction of a windshield frame provide a space for the reception of the gears 23 and 34, and the disks 24 form guides for the drive member.

It is to be understood that the forms of the invention herewith shown and described are to be to be taken as prefered examples of the same, and that various changes in the shape, size, and arrangement of parts may be resorted to without departing from the spirit of the invention or the scope of the subjoined claims.

Having thus described our invention, we claim:

1. In a windshield, a frame, a cleaner motor mounted on said frame interiorly of the vehicle, an actuating member arranged within said motor, a laterally extending bar connected to said actuating member for being reciprocated thereby and extending into the frame of the windshield, a reciprocatory drive member mounted in said frame and slidably guided by the inner wall of said frame, an operative connection between said drive member and said bar, and a cleaner element mounted on the exterior of the windshield and operatively connected to said drive member.

2. In a windshield, a frame, a cleaner motor mounted on said frame interiorly of the vehicle, an actuating member arranged within said motor, a bar connected to said actuating member and extending into the frame of the windshield, a drive member mounted in said frame and connected to said bar, a rack formed on said drive member, a shaft extending transversely of the windshield frame and projecting exteriorly therefrom, a gear mounted on said shaft within the frame and meshing with said rack, and a cleaner element mounted on the projecting portion of said shaft.

3. A windshield cleaner comprising a cleaner motor adapted to be secured to a windshield frame, said cleaner motor being provided with a longitudinally extending slot, an actuating member arranged within said motor, a bar connected to said actuating member and extending through said slot, a drive member mounted within the frame of the windshield, said frame being provided with a slot arranged adjacent the slot in the cleaner motor, said bar extending through said slot and being connected to said drive member, and a cleaner element mounted on the exterior of the windshield and operatively connected to said drive member.

4. In combination with a windshield frame bar of tubular formation having an inset glass-receiving groove providing an interior channel along one side thereof, a wiper-actuating gear member guided in its movement by the walls of said channel, a rack meshing with the gear member and slidable in the frame bar for operating said wiper-actuating member, and a disk carried by the gear and holding the rack against lateral play.

In testimony whereof, we affix our signatures.

FREDERICK G. FOLBERTH.
WILLIAM M. FOLBERTH.